Apr. 10, 1923.
B. P. HYDE
1,451,041
METHOD OF PRODUCING DISTINCTIVE ARTICLES
Filed Dec. 15, 1919
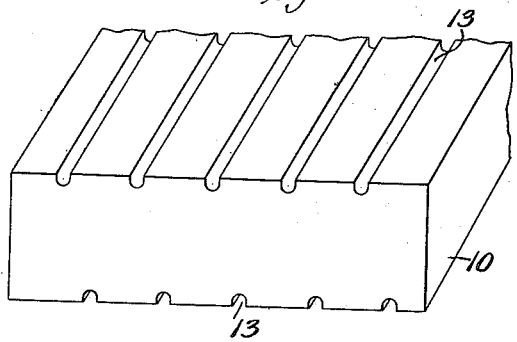
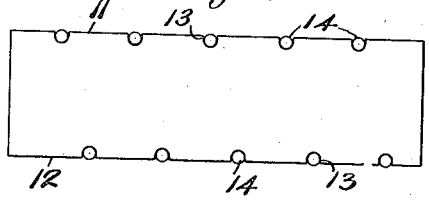
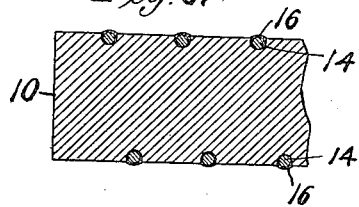
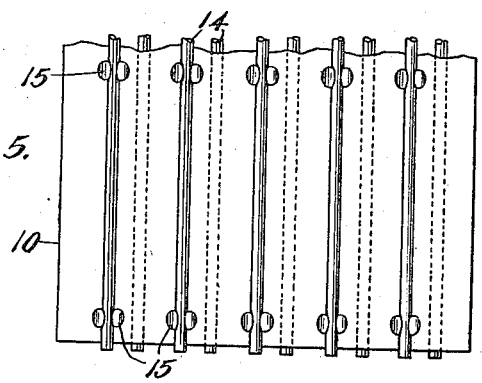
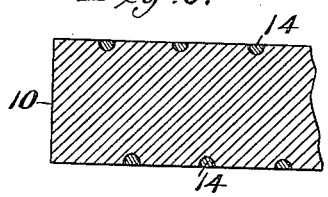
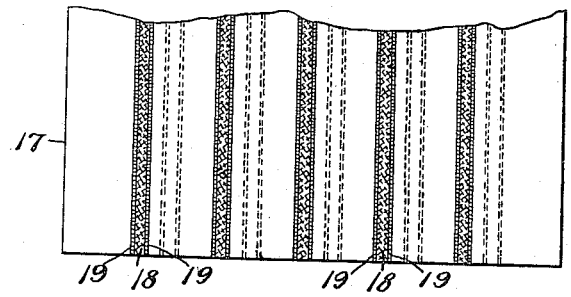
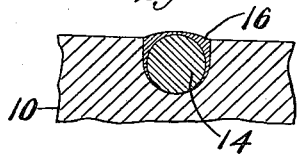
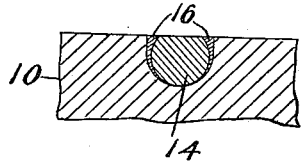
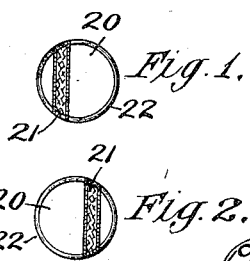
Inventor:
Burdon P Hyde
by his Attys:

Patented Apr. 10, 1923.

1,451,041

UNITED STATES PATENT OFFICE.

BURDON P. HYDE, OF WATERBURY, CONNECTICUT, ASSIGNOR TO SCOVILL MANUFACTURING COMPANY, OF WATERBURY, CONNECTICUT, A CORPORATION OF CONNECTICUT.

METHOD OF PRODUCING DISTINCTIVE ARTICLES.

Application filed December 15, 1919. Serial No. 344,990.

*To all whom it may concern:*

Be it known that I, BURDON P. HYDE, a citizen of the United States, residing at Waterbury, county of New Haven, and State of Connecticut, have invented certain new and useful Improvements in Methods of Producing Distinctive Articles, fully described and represented in the following specification and the accompanying drawings, forming a part of the same.

This invention relates to a method of producing distinctive articles, particularly metal checks and the like.

It is the principal object of the invention to provide a method of producing metal checks and the like, and the checks produced thereby, such that the checks are so distinctive in appearance as to be readily recognized, and of a character to discourage and avoid counterfeiting. Since, however, the method involved may be employed in the production of articles other than checks, the invention is also directed to a method of producing distinctive articles in general.

The invention consists in forming grooves in a block of metal, soldering wires in the grooves, rolling down the assembled block to the desired thickness and forming the desired articles therefrom.

The invention consists further in forming grooves in a block of metal, soldering wires in the grooves, rolling down the assembled block to the desired thickness, punching out check blanks, and finishing the blanks.

The invention further consists in forming grooves in a block of metal, soldering wires in the grooves, surfacing the assembled block, rolling the block to the desired thickness, and forming the desired articles therefrom.

In the accompanying drawing are illustrated exemplifications of various stages in carrying out the invention, and a check produced thereby.

In the drawings,

Figs. 1 and 2 are face views of the two faces of a check produced in accordance with the invention;

Fig. 3 is a perspective view of a grooved base block;

Fig. 4 is an end view of the same with wires laid in the grooves;

Fig. 5 is a top or bottom view of the block showing the grooves nicked to hold the wires;

Fig. 6 is a transverse cross sectional view of the block after soldering;

Fig. 7 is a similar view enlarged and exaggerated;

Fig. 8 is a view similar to Fig. 6 after the surfaces are planed;

Fig. 9 is a view similar to Fig. 7, after planing;

Fig. 10 is a top or bottom view of the plate after rolling; and

Fig. 11 is an edge view of the same.

In carrying out the invention, a base is provided in the form of a block or bar of metal. While the metal may be of any suitable nature, satisfactory results have been obtained with so-called coin metal having, for example, the composition, copper 75% and nickel 25%. The length and width of the base block may vary in accordance with the capacity of the machine which may be utilized, and the like. The thickness of the base blocks may also vary, satisfactory results having been obtained with a block from one-half inch to one inch thick.

The block is preferably worked on the two faces which are to be grooved, as later referred to, to provide substantially flat, parallel surfaces. This may be done conveniently in an ordinary milling machine. The base block is formed with grooves and in carrying out the invention according to what is considered the best method, these grooves are in spaced parallel relation, are of equal depth, and are rounded at the bottom. Further, the two opposite faces of the block are similarly grooved, the grooves of one face being staggered with relation to those of the other face for a purpose hereinafter referred to. In case checks are to be produced and a gang punch is to be used, the spacing of the grooves is determined by the distance between the punches of the gang, and by the known widening factor of the metal during the rolling operation later described. These grooves may be formed by any suitable cutter. With a substantially flat surface and equal cutting operations, the grooves are substantially equal in depth.

Wires, using the term in a broad sense, are then soldered in the grooves and in carrying out the invention according to what is considered the best method, these wires are of a metal that has substantially the same working characteristics, as the metal of the base block, and that has a contrasting color. Furthermore, the wires may conveniently be of a diameter or thickness that is slightly greater than the depth of the grooves and slightly less than the width thereof.

While the material of the wires may vary, a suitable composition for use with the coin metal described is copper 90% and zinc 10%. Wires of such composition will harden in working at about the same rate as the base metal and they have a gold-like color to contrast with the nickel or silver-like color of the base.

In carrying out the invention in its entirety, after the wires are laid in the grooves, to temporarily hold them in place during the soldering operation, the edges of the grooves are nicked at intervals. This may be done by punch marking the base block alongside the grooves. Solder is then poured along the wires in any suitable manner, and with wires that are slightly smaller than the grooves there will be a thorough flow of solder about the wires. Although the solder composition may vary, a satisfactory solder has the composition: silver 60%; copper 20%; zinc 20%. After the solder hardens, the faces of the base block are surfaced to obtain substantially flat surfaces.

With wires slightly larger than the groove depth, the wires project slightly above the original face of the base block. This surfacing or planing operation cuts away this projecting portion of the wires, removes any surplus solder, and obliterates the nicks or punch marks. While the extent of planing may vary as desired, it may advantageously be of such extent as to leave exposed substantially equal areas of solder and wire.

The assembled block is then rolled down to a plate of the desired thickness, for the articles to be produced. This rolling is preferably in the direction of the wire filled grooves. Since the metal in rolling will not widen equally throughout the width of the block, the original grooves are so spaced that the embedded strips in the rolled plate will be substantially equally spaced.

The result of the various steps so far described is a plate distinguished by embedded strips of other metal, flanked by strips of solder and from which various articles may be fashioned.

In case checks are to be produced, check blanks are punched from the plate. This may be done conveniently by a machine having a gang punch. As before stated, the grooves are preferably spaced in accordance with the gang punch and each face of the blank will have a strip of distinctive metal staggered equidistantly from the center. This provides the distinctive strip on each face of the check without weakening the check.

The check blanks are then finished and in carrying out the invention according to what is considered the best method, the finishing includes edge rolling. In this connection there is noted the importance of having the wires and base block of metals having substantially the same working characteristics, as with such relation the blanks take edge rolling properly.

The finishing of the check blanks may also include other operations, such as stamping piercing, and the like.

Referring to the drawings, a suitable base block is designated by the number 10. Fig. 3 shows the block with its opposite faces 11, 12 substantially flat and formed with grooves 13. As will be apparent, these grooves are substantially identical, and the two sets are staggered with relation to each other.

Fig. 4 shows the block with wires 14 laid in the grooves, these wires being of a diameter slightly greater than the groove depth and slightly less than the groove width.

Fig. 5 illustrates the edges of the grooves nicked or punch marked, as at 15, to temporarily hold the wires in place.

Figs. 6 and 7 show the assembled block after the soldering operation, the exaggerated view of Fig. 7 showing a thorough flow of solder about the wires.

In Figs. 8 and 9 is illustrated the block after the planing or surfacing operation, the faces being cut down to cut through the solder 16 and wires to leave substantially equal areas of the two exposed.

Figs. 10 and 11 show the plate 17 formed by rolling down the assembled block, with equally spaced strips 18 of distinctive metal furnished by the embedded wires, flanked by strips 19 of the hardened solder.

From such a plate various articles of an ornamental and distinctive nature may be produced.

The plate is, however, particularly adaptable to the production of metal checks. Check blanks are readily punched from the plate 17, as, for example, by a gang punch.

In Figs. 1 and 2 is illustrated a metal check 20 produced from such a plate. Each face of the check has a distinctive strip 21 of embedded wire and solder, the two strips being equally staggered from the center so as not to weaken the blank. The check is edge rolled, as at 22, and may be otherwise finished, as by piercing, stamping, and the like.

Such a check is of particular utility as a medium of exchange for street car fares and the like, where the unit of exchange is other than any unit government coin. It is easily recognized, owing to its distinctive character, and danger of counterfeiting is removed, because the nature of the check and the method of the production makes counterfeiting too difficult and expensive to be worth while.

What is claimed is:

1. The herein described method of producing a distinctive article which consists in forming grooves in a block of metal, soldering wires in the grooves, rolling down the assembled block to the desired thickness, and forming the article therefrom.

2. The herein described method of producing distinctive checks which consists in forming grooves in a block of metal, soldering wires in the grooves, rolling down the assembled block to the desired thickness, punching out check blanks, and finishing the blanks.

3. The herein described method of producing distinctive articles which consists in forming grooves in a block of metal, soldering wires, of slightly greater diameter than the groove depth, in the grooves, planing down the assembled block to form a plane surface, rolling the block to a plate of the desired thickness, and forming the article therefrom.

4. The herein described method of producing distinctive checks which consists in forming a block of metal with at least two substantially flat parallel faces, forming spaced grooves in each face with one set of grooves staggered with relation to the other set, soldering wires in the grooves so that they project slightly from the face of the block, planing down the assembled block to a substantially plane surface, rolling down the block to a plate of the desired thickness, punching check blanks from the plate to provide each blank with opposite strips equally spaced from the center and finishing the blanks.

5. The herein described method of producing distinctive checks which consists in forming grooves in a block of metal, soldering wires, having substantially the same working characteristics as the block metal, in the grooves, surfacing the assembled block, rolling down the block to a plate of the desired thickness, punching check blanks from the plates, and edge rolling the blanks.

6. The herein described method of producing distinctive articles which consists in forming grooves in a block of metal, placing wires in the grooves, nicking the edges of the grooves to temporarily hold the wires in place, soldering the wires in the grooves, surfacing the assembled block, rolling down the block to a plate of the desired thickness, and forming the articles therefrom.

7. The herein described method of producing distinctive articles which consists in forming grooves in a block of metal, soldering wires of slightly less diameter than the width of the grooves and slightly greater diameter than the depth thereof, in the grooves, planing down the assembled block to form a substantially plane surface, rolling down the block to a plate of the desired thickness, and forming the articles therefrom.

8. The herein described method of producing distinctive articles which consists in forming grooves in a block of metal, soldering wires, of a diameter slightly greater than the groove depth, in the grooves, planing the face of the block so as to form a substantially plane surface exposing substantially equal areas of solder and wire, rolling the block to a plate of the desired thickness, and forming the article therefrom.

In testimony whereof, I have hereunto set my hand.

BURDON P. HYDE.